(12) United States Patent
Cherney et al.

(10) Patent No.: US 6,700,054 B2
(45) Date of Patent: Mar. 2, 2004

(54) SOLAR COLLECTOR FOR SOLAR ENERGY SYSTEMS

(75) Inventors: Matthew Cherney, Mt. Vernon, NY (US); Michael Stiles, Syracuse, NY (US); Norman Williams, Mt. Vernon, NY (US)

(73) Assignee: Sunbear Technologies, LLC, Mt. Vernon, NY (US)

( * ) Notice: Subject to any disclaimer, the term of this patent is extended or adjusted under 35 U.S.C. 154(b) by 0 days.

(21) Appl. No.: 09/771,807

(22) Filed: Jan. 29, 2001

(65) Prior Publication Data

US 2001/0006066 A1 Jul. 5, 2001

(51) Int. Cl.$^7$ .................. H01L 31/052; H01L 31/058; F24J 2/00; F01B 29/00
(52) U.S. Cl. .................. 136/246; 136/206; 136/251; 126/569; 126/683; 385/900; 60/641.15; 359/726
(58) Field of Search .................. 136/246, 251, 136/259, 248, 206; 126/569, 710, 623, 683, 698, 628, 634, 639, 643, 684, 704; 385/900; 60/517, 641.8; 359/726

(56) References Cited

U.S. PATENT DOCUMENTS

| | | | | |
|---|---|---|---|---|
| 4,045,246 A | * | 8/1977 | Mlavsky et al. | 136/246 |
| 4,081,289 A | * | 3/1978 | Campbell, III | 136/246 |
| 4,169,738 A | * | 10/1979 | Luque | 136/246 |
| RE30,584 E | * | 4/1981 | Russell | 136/246 |
| 4,337,759 A | * | 7/1982 | Popovich et al. | 126/684 |
| 4,344,417 A | * | 8/1982 | Malecek | 126/687 |
| 5,255,666 A | * | 10/1993 | Curchod | 126/569 |
| 5,456,076 A | * | 10/1995 | Zornes | 60/525 |
| 6,057,505 A | * | 5/2000 | Ortabasi | 136/246 |
| 6,061,181 A | * | 5/2000 | Fereidooni | 359/625 |

FOREIGN PATENT DOCUMENTS

| | | | | |
|---|---|---|---|---|
| JP | 56023666 A | * | 3/1981 | F24J/3/02 |
| WO | WO 00/07055 | * | 2/2000 | G02B/17/00 |

OTHER PUBLICATIONS

Serway, Raymond A., Physics: For Scientists & Engineers, 3rd Ed. (1990) pp. 998–1000. No month.*
http://www.plasticusa.com/refract.html.
Duke Scienfitic Corporation—Technical Note–007B, Dec. 1, 1996.
http://www.is.kiruna.se/~cjo/d2i/Refraction.Index3.html No date available.
http://hyperphysics.phy–astr.gsu.edu/hbase/tables/indrf.html No date available.
http://www.philiplaven.com/p20.html No date available.
http://ntp–support.niehs.nih.gov/NTP_Reports/NTP_Chem_HS_HTML/NTP_Chem1/Radian 124–1 No date available.
Valley Design Corp. http://www.valleydesign.com/pr16.htm No date available.

* cited by examiner

Primary Examiner—Edna Wong
Assistant Examiner—Brian L Mutschler
(74) Attorney, Agent, or Firm—Milde & Hoffberg LLP

(57) ABSTRACT

A solar collection system and method having means for receiving solar radiation through a main refractive interface and means for internally reflecting at least once, at least a portion of the received solar radiation. The refractive medium may be liquid, gel or solid. The device may be integrated with a photovoltaic device, photohydrolytic device, a heat engine, a light pipe or a photothermal receptor.

30 Claims, 20 Drawing Sheets

FIGURE 1
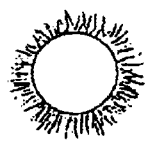
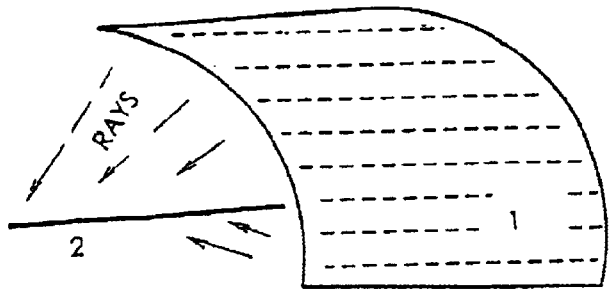
FIGURE 2
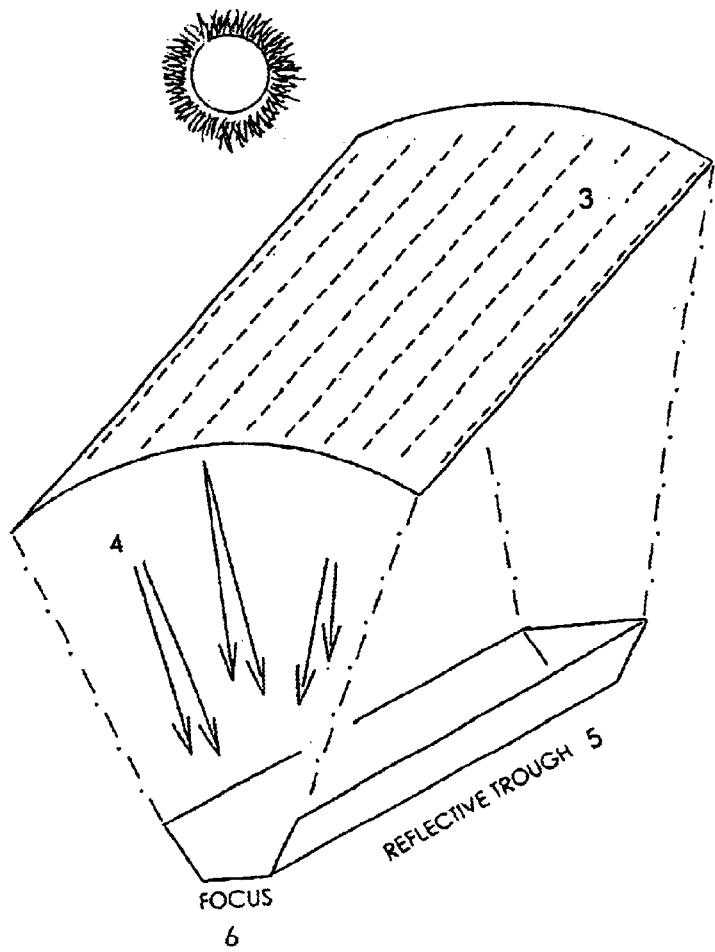

FIGURE 3
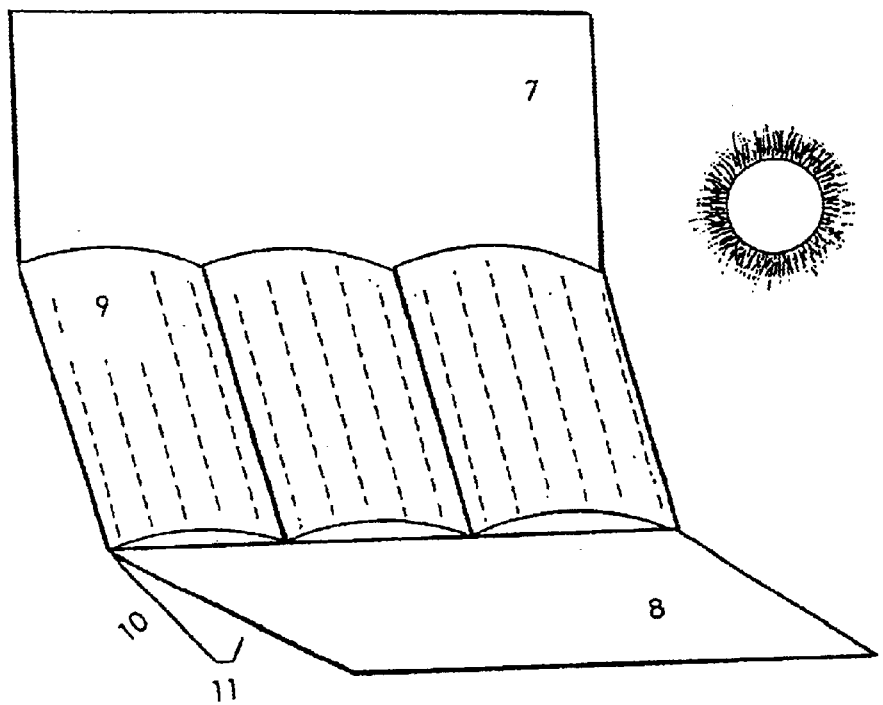
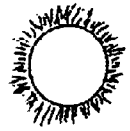
FIGURE 4
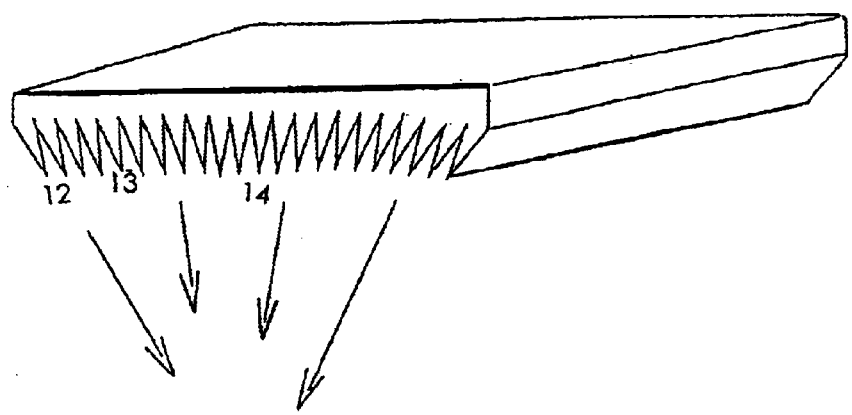

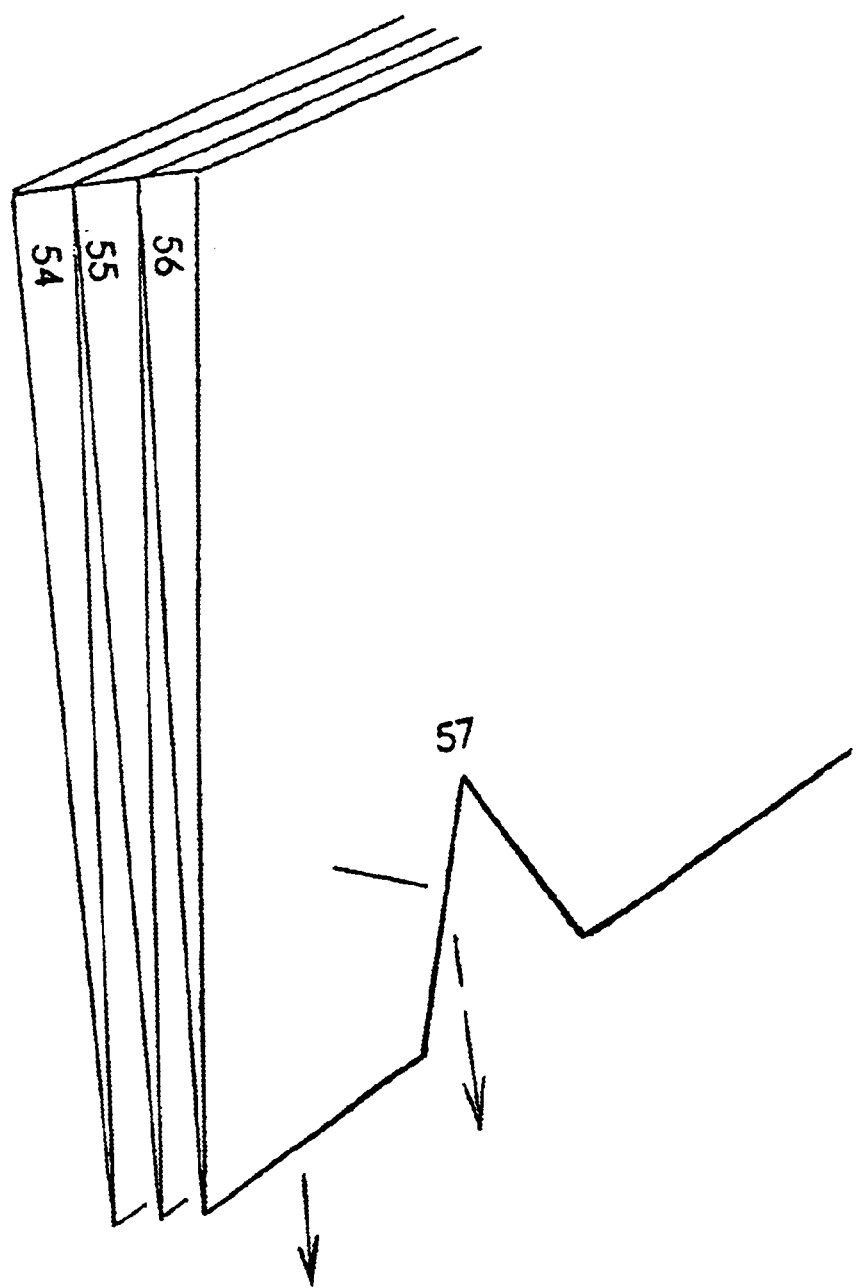

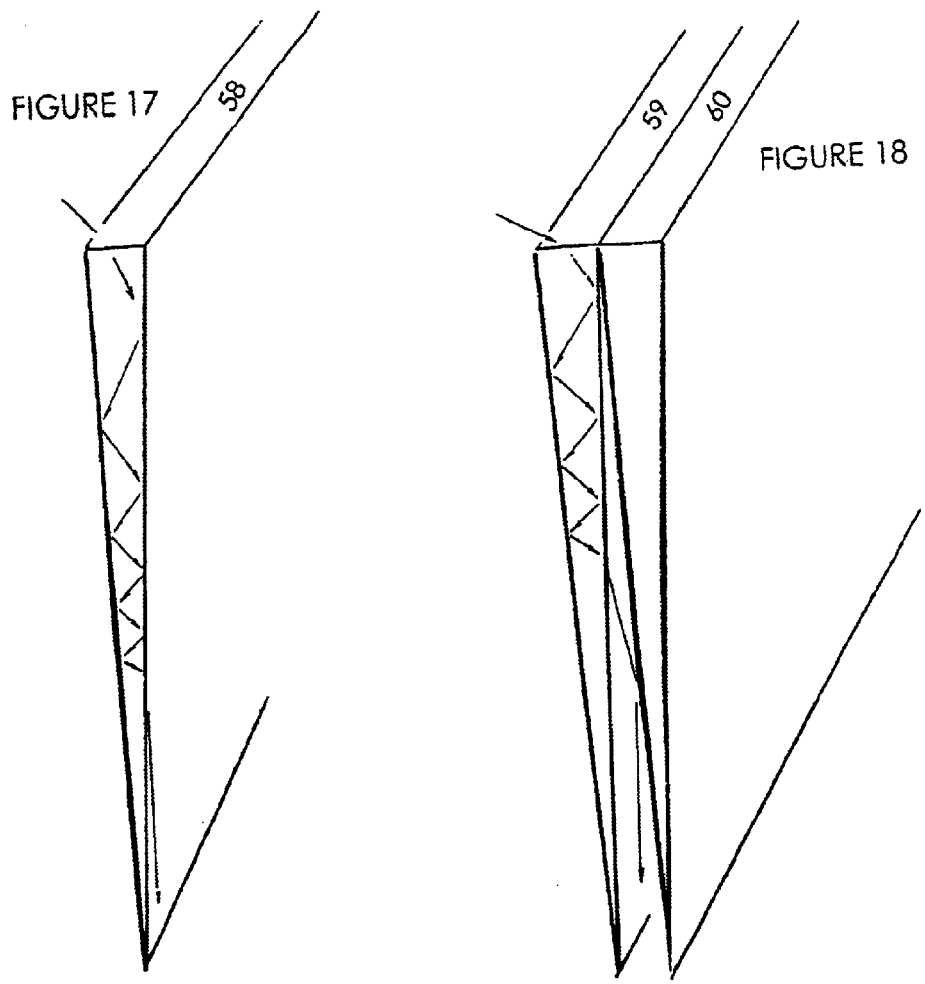
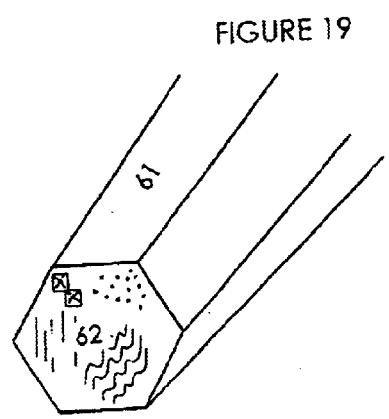

SOLAR COLLECTOR FOR SOLAR ENERGY SYSTEMS

FIELD OF THE INVENTION

The present invention relates to solar concentrators, and more particularly to concentrators capable of harnessing light without accurate tracking due to the use of total internal reflection.

BACKGROUND OF THE INVENTION

Existing solar concentrators use lenses and reflectors that are very sensitive to angle of incidence, requiring accurate tracking with all its drawbacks. These systems can't harness diffuse light or feed light from cheap reflectors to refractive interfaces, and typically cannot achieve concentration ratios to compete with conventional utilities.

SUMMARY AND OBJECTS OF THE INVENTION

The present invention provides a solar energy system that achieves concentration for incident solar energy without requiring accurate solar tracking or high precision reflectors. This concentration is achieved by total internal reflection ("TIR") within a tapering refractive element, which, according to Snell's law, will produce, from the refractive element, a smaller exit angle than the corresponding angle of incidence.

The tapered TIR element may be, for example, a wedge, a cone, polygonal pyramid, irregular or asymmetrically shaped refractive object. It is preferred that the internally reflective faces of the TIR element be smooth, and that the TIR element taper to a sharp tip, although embodiments of the invention do not all require such conditions. In addition, the refractive index of the TIR element may be uniform or graded, or the TIR element formed as a composite of solids or solids and liquids, with the same or different refractive indices. The surfaces of the TIR element may also be coated.

The TIR refractive element typically receives light through an interface, which is typically a refractive interface with air. Preferably, the difference in refractive index between the TIR refractive element and air is great, for example the refractive element has a refractive index of at least 1.5, and preferably 1.7 or greater. The index of refraction of air is about 1.0. The light, after entering the TIR refractive element, passes through the refractive medium, and, according to Snell's law, will internally reflect at each interface wherein the angle of incidence is below a critical angle and will pass through the interface wherein the angle of incidence is greater than the critical angle. Because the TIR refractive element tapers, the edge interfaces are inclined with respect to each other. Therefore, the critical angles for the respective edge interfaces are less than 180° apart. This results in a relative convergence of the rays (as compared to the incident radiation) toward a projection of a line of symmetry between the respective edge interfaces.

Light entering a transparent wedge or conical element thus remains in total internal reflection until a critical angle is reached, at which point the light exits, generally pointing in the direction of a "focus" and having an exit "spread" or "cone" which is dependent on the shape and index of refraction of the TIR element. Higher indices of refraction and gradual (narrow angle) tapers generally yield narrower exit spreads, according to Snell's law.

By providing a gradual taper, internal reflections off the converging faces will gradually approach the critical angle, so that when the internally reflected light exits, it will be at or near the critical angle, and when light reflects internally it will proceed toward the tip and not reflect back toward the entrance aperture.

In theory, a material with an index of refraction of 1.7 would have a critical angle of about 36° and an exit angle of about 88°, pointing the light generally toward the focus, over a wide range of incident light angles. In practice, an exit "spread" is observed. Therefore, the TIR element achieves "rough collimation" of the incident light. The "roughly collimated" light produced by the TIR element can be focused to high light concentrations by many mechanisms, and therefore a substantial benefit is achieved as compared to known tracking solar collector systems.

Various embodiments of the invention provide a plurality of TIR elements in parallel. Since each TIR element roughly collimates light, these plurality of TIR elements may have converging foci. The incident face, or "main refractive interface" of these plurality of TIR elements may be planar or, for example, have an overall convex curvature. The roughly collimated light from one or more TIR elements may be further concentrated with additional TIR elements in series, by lenses and/or reflectors.

Four functions describe the ideal main refractive interface: First, rays already heading toward the focus should pass with minimal deviation. Second, some portion of the collected rays are refracted and exit after a small number of "bounces" at or near the critical angle. Third, those rays not naturally falling into categories 1 or 2 above should be gently corrected so as to have a minimal number of internal reflections, but still exit as closely as possible to the desired critical angle. Fourth, those rays exiting the main refractive interface but not heading toward the focus should be in a narrow enough spread to be redirected by cheap secondary optics (e.g. reflective troughs).

The concentrated solar energy may be used in known manner, for example for illumination, heating, photovoltaic conversion, generation of combustible gasses, thermo-mechanical conversion (steam engines, Stirling cycle engines, etc.), photoprocessing of materials, etc. The present invention also provides new embodiments of solar energy conversion systems.

It is therefore an object of the present invention to provide a solar collector comprising an elongated light guide, having an axis, the light guide comprising a high optical refractive index liquid or gel material and a boundary separating the high optical refractive index liquid or gel material from a relatively lower optical refractive index material, and an entrance aperture structure adapted to receive incident light substantially deviating from the axis, wherein the high optical refractive index liquid or gel material of the elongated light guide concentrates light received through the entrance aperture and provides light concentration as compared to incident optical density on the entrance aperture; and a photoelectronic solar transducer for employing energy from the incident light, immersed within the liquid.

It is also an object of the present invention to provide a solar collector comprising a tapered elongated light guide and an axis, comprising a high optical refractive index material and a boundary separating the high optical refractive index material from a relatively lower optical refractive index material, and an entrance aperture adapted to receive incident light substantially deviating from the axis, wherein the high optical refractive index material of the elongated light guide transmits and concentrates light received through the entrance aperture by a process of total internal reflection, the tapered elongated light guide having a taper angle dependent on a ratio of the high optical refractive index to the relatively lower optical refractive index.

It is a further object of the present invention to provide a solar collector comprising an elongated light guide, having an axis, the light guide comprising a high optical refractive index material and a boundary separating the high optical refractive index material from a relatively lower optical refractive index material, and an entrance aperture structure adapted to receive incident light substantially deviating from the axis, wherein the high optical refractive index material of the elongated light guide concentrates light received through the entrance aperture and provides light concentration as compared to incident optical density on the entrance aperture, at least a portion of the light exiting into the relatively lower optical refractive index material; and a reflector for recovering light from the relatively lower optical refractive index material.

It is also an object of the invention to provide a solar collector comprising a main refractive interface, adapted for wide angle reception of solar radiation, and a set of projections from the main refractive interface, each narrowing an exit angle of the received solar radiation from the angle of reception by a process of total internal reflection.

It is another object of the invention that the elongated light guide may be configured such that incident light substantially deviating from the axis received through the entrance aperture undergoes successive internal reflections in the high optical refractive index material, each reflection having a successive angle of incidence on an interface between the high optical refractive index material and the relatively lower optical refractive index material until a critical angle is reached, whereupon the light is transmitted through the interface into the relatively lower optical refractive index material at a smaller angle with respect to the axis than the incident light.

Suitable solar receptors for employing energy from the incident light include a photovoltaic transducer, photohydrolytic transducer, a heat engine, a light pipe and a photothermal receptor.

In a preferred embodiment, the main refractive interface is stationary, but may also crudely track solar movement or be associated with elements, either before or after the total internal reflective element, which crudely track solar movement.

The total internal reflection element is preferably a high index of refraction element having smooth tapering internal reflection faces that meet at a sharp junction.

It is a further object of the invention to provide a solar collection method for using the solar collector comprising the steps of receiving solar radiation through the main refractive interface, and internally reflecting at least once, at least a portion of the received solar radiation, in a set of projections from the main refractive interface to narrow an exit angle of the received solar radiation therein.

It is a still further object of the invention to provide a method of fabricating a TIR solar collector, comprising molding a main refractive interface and set of projections as a planar sheet and vacuum forming the planar sheet into a non-planar sheet.

BRIEF DESCRIPTION OF THE DRAWINGS

The preferred embodiments will now be described with reference to the drawings, in which the same features of the drawing is represented with the same reference numerals:

FIG. 1 shows a refractive interface that is arched to form a line focus;

FIG. 2 shows an exploded view of a line focus design showing secondary reflectors;

FIG. 3 shows three solar collection units which are augmented by reflectors to the north and south;

FIG. 4 demonstrates formation of a line focus from a flat refractive interface by varying the angles of the projections of TIR elements;

FIG. 16 shows an enlarged portion of a wedge embodiment of the main refractive interface;

FIGS. 17 and 18 show various embodiments of wedge-shaped total internal reflection elements;

FIG. 19 shows a TIR element having a blunt textured tip;

DETAILED DESCRIPTION OF THE PREFERRED EMBODIMENTS

Figure 5:
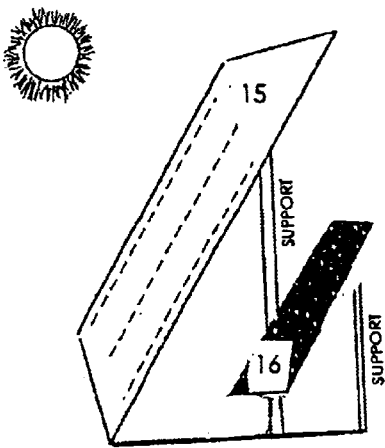
FIG. 5 shows a side view of a line focus formation by a flat refractive interface.

FIG. 1 shows "line focus" formation. Refractive interface 1 guides rays to focus 2. The non-planar interface may be arched symmetrically, asymmetrically or grossly segmented into a free space-obliterating pattern of polygons. Ultrastructural projections, represented by dashed hidden lines, may be wedges or conical rods. "Wedges" and "conical rods" may include asymmetric tapers as well as space obliterating geometry (such as hexagons or squares on the input side of "conical rods"). A clear supporting layer is generally needed.

FIG. 2 is an exploded view of a line focus design solar concentrator unit. Rays 4 (with exit spreads) leave refractive interface 3, are harnessed by reflective trough 5 and fed to focus 6. Planar or non-planar reflectors are practical, with their angular optimization desirable. Secondary lenses may act with the reflectors. The reflectors may be coated with a refractive substance that preferentially guides light toward the focus. Secondary reflectors to the north and south can be similarly optimized. A semiconductor, light pipe or blackened water pipe may be provided at the focus.

FIG. 3 shows a set of line focus solar concentrator units augmented by reflectors 7 and 8 to the north and south. The augmentation reflectors may be planar or non-planar and may have their angular relationships to refractive interface 9 optimized. They may be coated with a refractive substance that preferentially guides light toward the refractive interfaces, the refractive interfaces being oriented from north to south or east to west. Rays hitting secondary reflector 10 are guided to focus 11, as described previously. The array can be adjusted (in its entirety) by tipping it slightly to the north or south depending on the seasonal path of the sun. Note that the projections from FIGS. 1, 2 and 3 may be filled with a high index liquid, the index of refraction of the projections may be graded and micro-shapes may be added to their tips/edges, i.e., although it is desirable for any projection to taper to a sharp tip/edge, this may not be practical. Therefore, it may become necessary to redirect light exiting a tip/edge that is not sharp, using micro-shapes (e.g., a textured pattern) to guide the light toward the focus. These micro-shapes efficiently ensure efficient extraction of light from the TIR element.

FIG. 4 shows a flat refractive interface forming a line focus by varying the angles of ultrastructural projections 12, 13 and 14, etc. The ultrastructural projections may include any variation described previously. Optional augmentation and secondary reflectors (not shown) may include any variation described previously.

FIG. 5 shows a side perspective view of the flat refractive interface 15, forming line focus 16 with any optional reflectors removed, showing the rough spatial relationship between the refractive interface and the focus.

Figure 6:
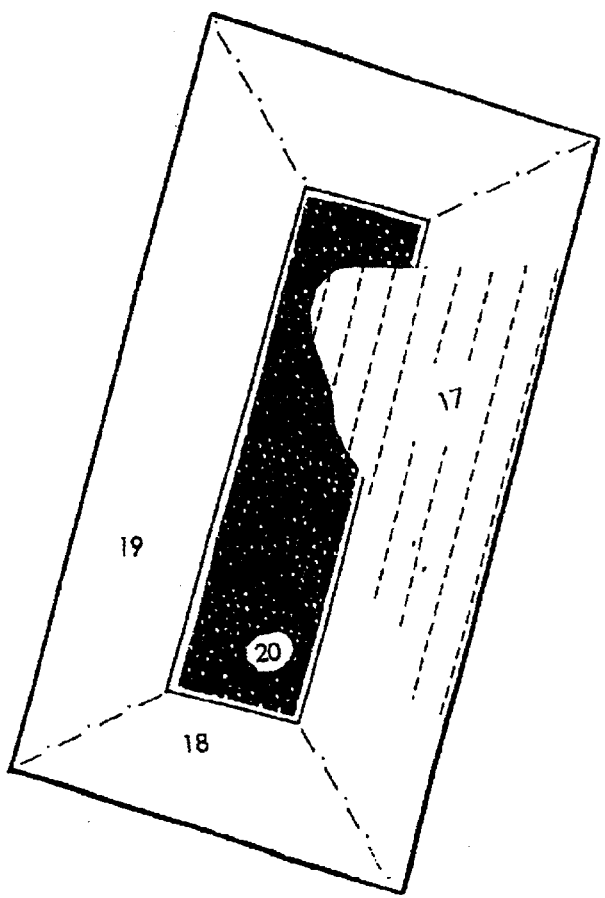
FIG. 6 shows a top partial cutaway view of a solar collector with a flat refractive interface.

FIG. 6 shows a cutaway front view of line focus solar concentrator unit with optional augmentation reflectors removed. The main refractive interface 17 is partially cut away to show secondary reflectors 18 and 19 with focus 20. Any variation described previously for the optional augmentation reflectors, the refractive interface or the secondary reflectors may be employed.

Figure 7:
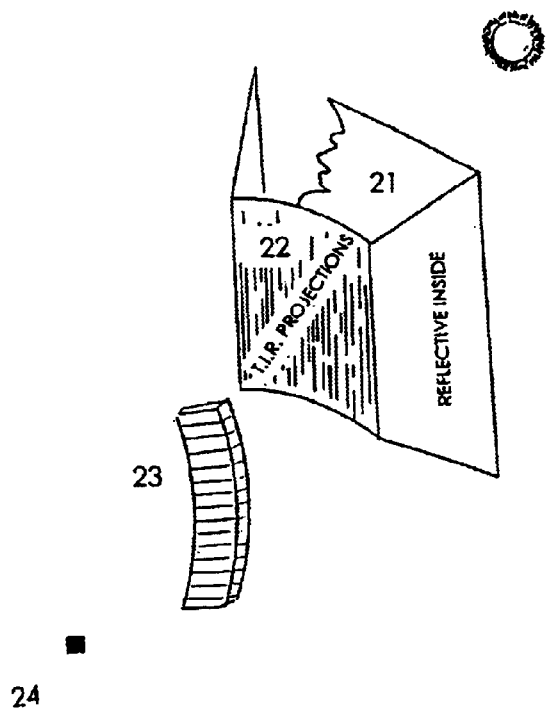
FIG. 7 shows formation of a point focus by rotating a secondary refractive piece 90°.

FIG. 7 shows a tracking collector in which augmentation reflector system 21 (with top reflector cut away), which feeds refractive interface 22. Secondary refractive interface 23 is rotated 90 degrees to yield point focus 24. Secondary reflectors are not shown but are preferably employed. Plain slats interspaced with virtual air spaces are shown for the secondary refractive element, rotated 90 degrees, but any refractive variation mentioned previously that condenses light perpendicular to the main refractive interface may be used. A convex lens may also be used as the secondary refractive piece.

Figure 8:
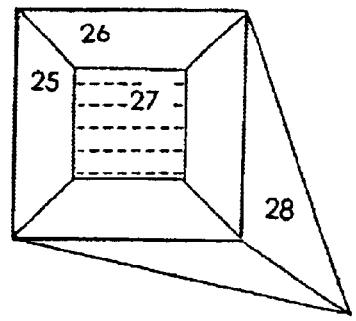
FIGS. 8, 9 and 10 show perspective views of a large power plant, having a crudely tracking main refractive interface and a secondary set of TIR elements rotated 90° to form a point focus.

FIG. 8 is a large, crude-tracking power plant model, having a point focus. Augmentation reflectors 25 and 26 feed light to refractive interface 27. A second refractive interface rotated 90 degrees is enclosed in reflective housing 28, thus forming the point focus. The augmentation reflectors and reflective housing may be planar or non-planar and can have their angular relationships adjusted for optimal performance. The augmentation reflectors may be coated with a refractive layer that preferentially guides light in the direction of the focus.

Figure 9:
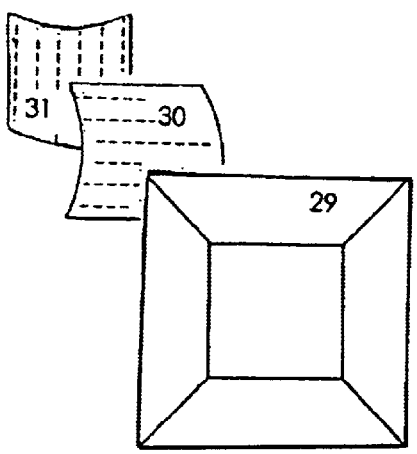

FIG. 9 shows an exploded view of point focus formation with the secondary reflective housing removed. Augmentation reflectors 29 feed main refractive interface 30 which, in turn, feeds refractive interface 31, which has been rotated 90 degrees, yielding point focus 32. Concentration ratios reached by this method can be extremely high and a hybrid heat engine system is the intended receptor (described below). The reflectors and refractive interfaces may use any of the variations previously described.

Figure 10:
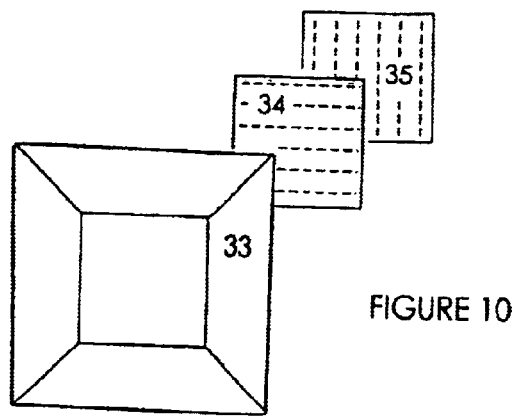

FIG. 10 is an exploded view of point focus formation as in FIG. 9, except that the refractive interfaces shown are flat. Reflectors 33 feed refractive interfaces 34 and 35, yielding point focus 36. Note that for the point focus embodiments from FIGS. 8, 9 and 10, a one-layer dome or other non-planar one-layer refractive interface is feasible and will be described below. For radially symmetric refractive interfaces, a conical reflector system may be employed.

Figure 11:
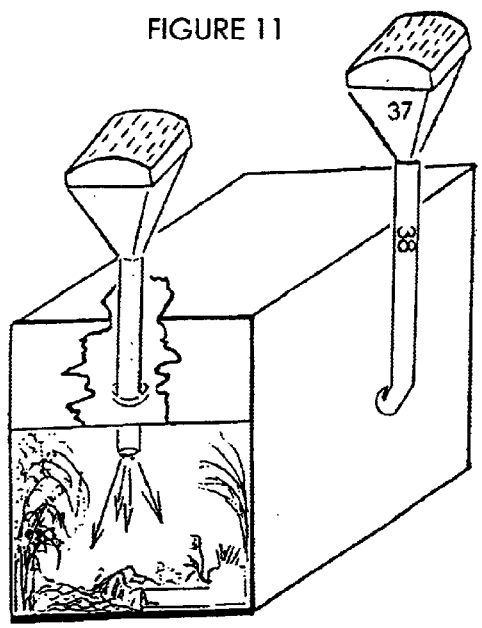
FIG. 11 shows point focus concentrators for use with light pipes for passive lighting applications.

FIG. 11 shows an alternative point focus embodiment for passive lighting. Point focus concentrator 37, which may have two refractive interfaces rotated 90 degrees or utilize a one-layer dome, feeds light pipe 38, to deliver light to the interior of the structure to be supplied. In the foreground, a cutaway view shows the narrow light pipe traversing more than one story. Optional augmentation reflectors have not been shown in the figure.

Figure 12:
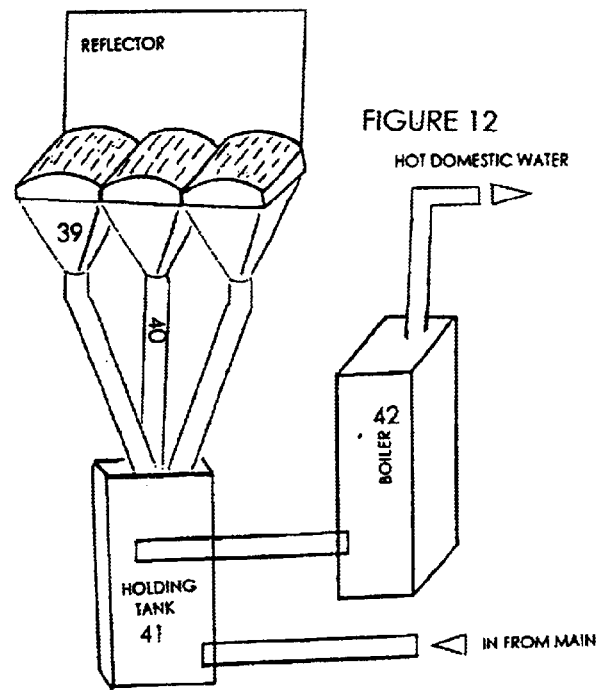
FIG. 12 shows point focus concentrators feeding light directly to the inside of a pre-heating tank, eliminating all moving parts and feedback devices.

FIG. 12 shows an alternative embodiment for water heating. Point focus concentrator 39 and its neighboring concentrators feed light pipes such as light pipe 40, which transmit light to the interior of holding/pre-heating tank 41 from where boiler 42 is supplied. The point focus concentrator(s) may use two refractive interfaces rotated 90 degrees or a single-layer dome. Optional augmentation reflectors have been partially shown. This system has no moving parts or feedback devices and has greatly reduced heat losses compared to systems that pump a fluid to black roof panels.

Figure 13:
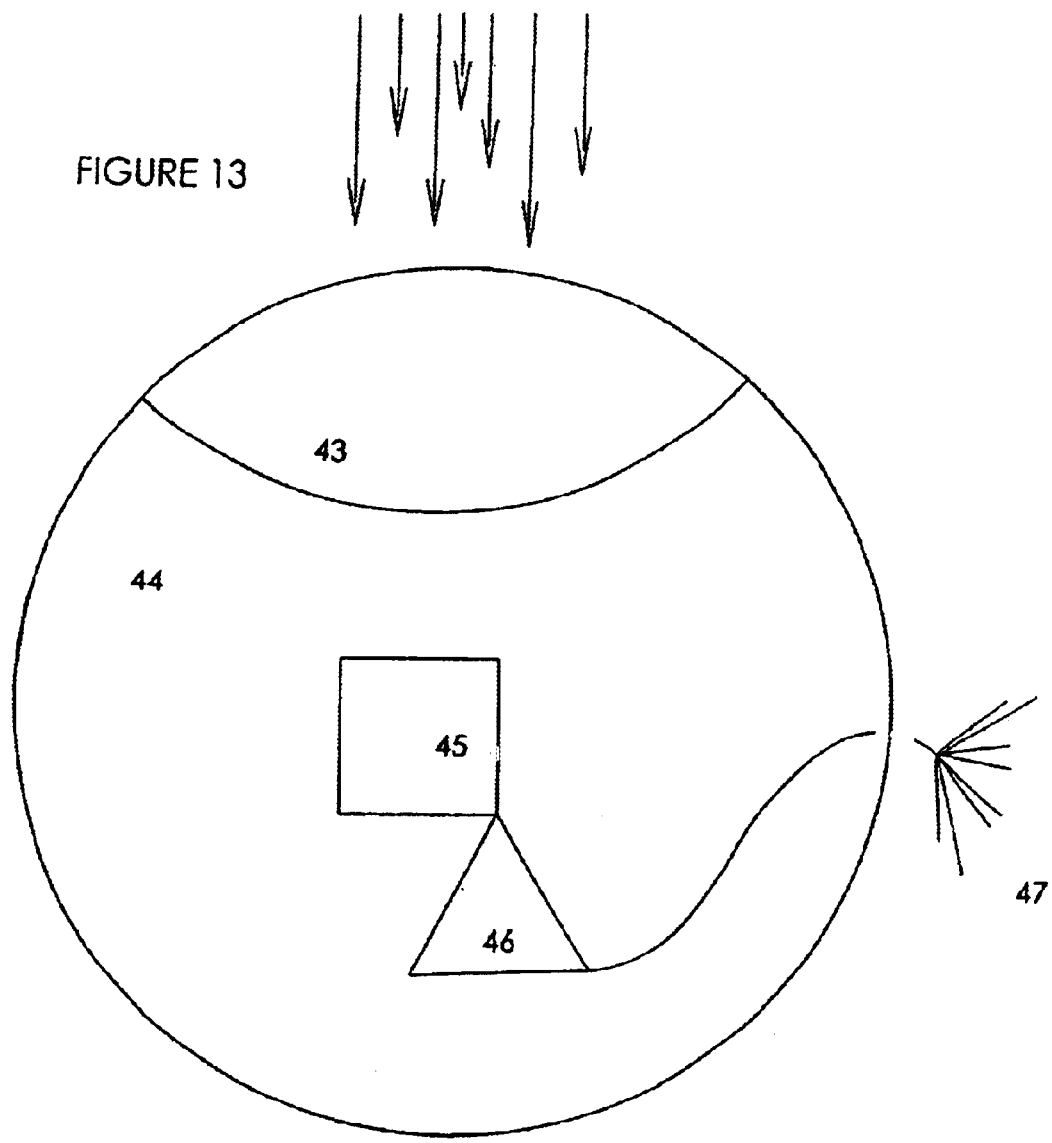
FIG. 13 shows a vacuum receptor for a point focus design.

FIG. 13 is a vacuum receptor for a point focus design. Convex refractive layer 43 feeds concentrated rays through vacuum chamber 44 to a thin black metallic piece 45. A thermal gradient then guides the heat to a Stirling engine or other heat engine system 46. The heat is eventually dissipated to the air 47 via a mechanism that can be controlled for optimal efficiency. In this case, the Stirling heat engine system 46 can transfer most or all of its waste heat to a steam turbine outside of the vacuum chamber.

Figure 14:
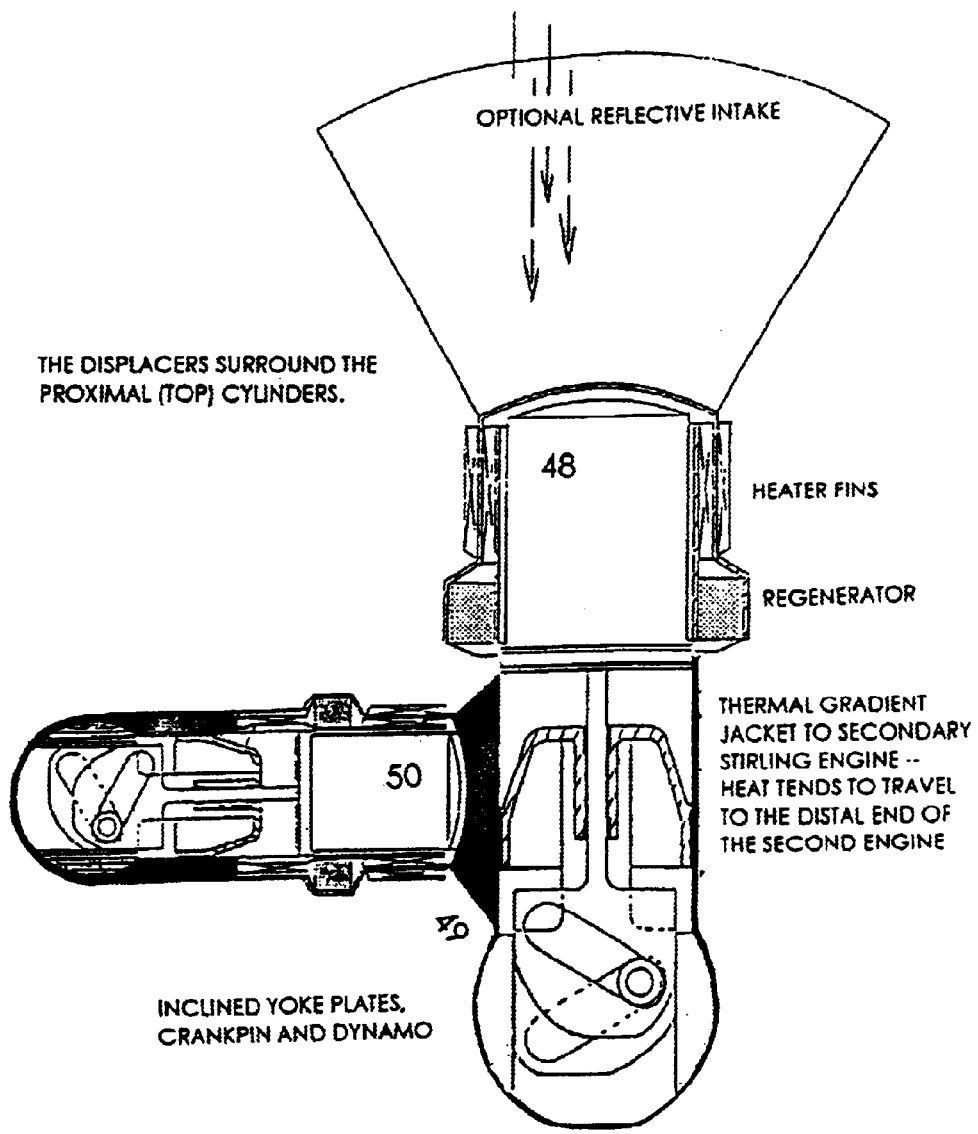
FIG. 14 shows a Stirling engine system that makes use of waste heat.

FIG. 14 shows a Stirling engine system in which the waste heat is used productively. Concentrated rays hit main cylinder 48 which channels heat through thermal gradient collar 49 to recapture engine 50. Note that the recapture engine is positioned where a water jacket normally dissipates waste heat without gainfully employing it to recapture energy. A key feature of the thermal gradient collar is even heat transfer so as not to distort the primary cylinder. Ideally, thermal gradient collar 49 and recapture engine 50 maximally increase delta T in the primary cylinder. Note that the thermal gradient can be further productively used by placing a steam turbine (rather than a simple water jacket) to draw heat from the recapture cylinder.

Figure 15:
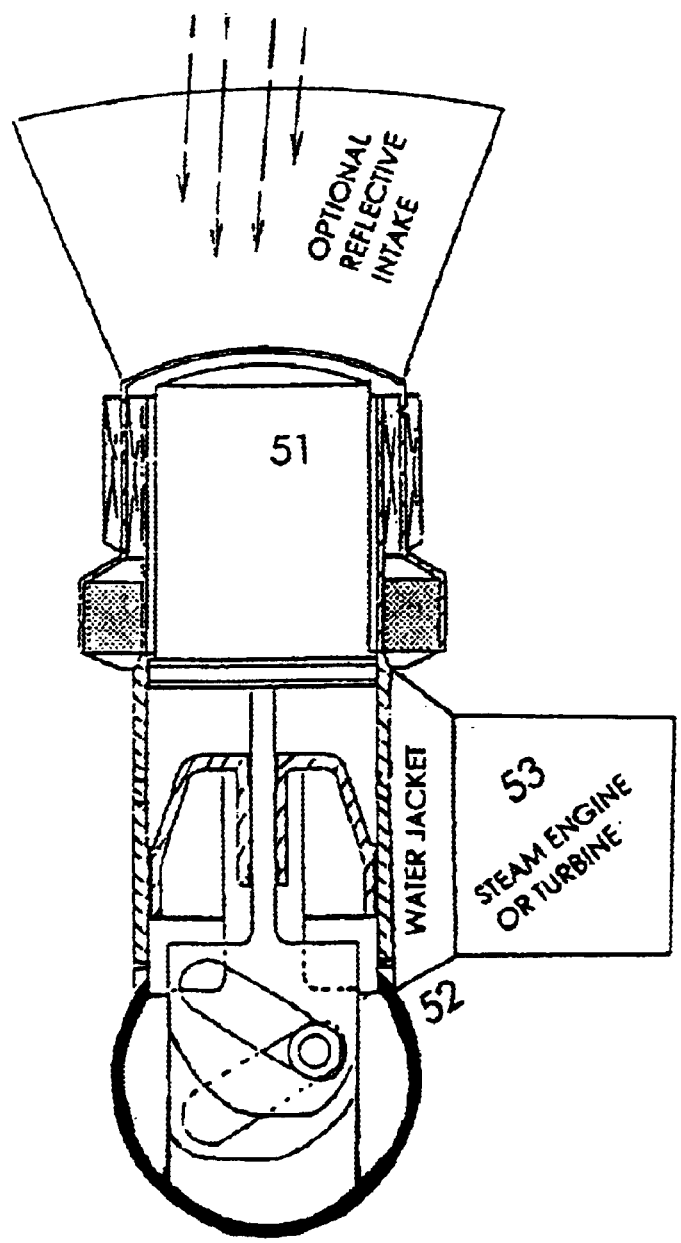
FIG. 15 shows a receptor system combining a Stirling and steam engine (turbine)

FIG. 15 demonstrates main Stirling cylinder 51 connecting to steam turbine 53 via water jacket 52. Note that the water jacket is drawn schematically and should completely surround the cylinder for even heat transfer. Note also that, for FIGS. 14 and 15, a multiplicity of Stirling or steam engines can be arranged around the distal end of the main cylinder. Infrared studies may be used to optimize the relationship between the primary cylinder and the recapture devices, with maximal delta T in the primary cylinder the optimization parameter. Obviously, different metals can be used for the cylinders, pistons and collars to accentuate the thermal gradient(s). The mass of the component metals can be distributed for optimal performance. For FIGS. 14 and 15, other "stick" engine designs, "v" shaped designs and "side by side" designs can use the same heat conserving principles, rather than simply dissipate the waste heat without benefit, such as through a water jacket and fins.

FIG. 16 is a blow-up of the bottom part of a refractive interface with wedges 54, 55 and 56 as their main ultrastructural shape. The top supporting layer has not been drawn. It is also possible to employ conical rods, optimized by three dimensional analysis, for many designs. Notch 57 serves to refract light that hits the refractive interface at extreme angles (such as at the solstices) toward the focus.

FIG. 17 shows wedge 58 with refractive index of 1.7, thus yielding a critical angle about 36 degrees and an exit angle of about 88 degrees. In practice, a small exit spread is observed. The wedge 58 may have a non-linear taper, for example increasing or slightly decreasing in convergence angle toward the tip.

FIG. 18 demonstrates the phenomena of "autocorrection." The ray entering wedge 59 (also index 1.7) misses the critical angle significantly and so exits at 77 degrees (instead of 88 degrees). It then glances off wedge 60 and "autocorrects" slightly. Autocorrection data can be fed into a computer for optimization. Note that while 1.7 has been suggested as a suitable index of refraction, owing to its critical and exit angles, in practice the only absolute is that the index must be "high". Clearly, light which exits near the tip/edge of a projection with a wide "spread" is the most troublesome. Methods of correcting this troublesome light include increasing the index of refraction near the tip, keeping the taper extremely shallow (so that the ray slowly creeps to the critical angle) and using micro-shapes to draw light out of the supra-tip in the direction of the focus.

FIG. 19 shows a tapering hexagon 61 that is chopped short with micro-shapes 62 employed to direct light to the focus. Note that squares are space-obliterating, just as hexagons are. Owing to the limits of the molding machinery, there will generally be two choices for the fabricated tip: include a transition zone, similar to the appearance of a pencil point; and cut the projection tip off and score the resulting surface with various micro-shapes, (i.e. cut the tip off the mold).

Figure 20:
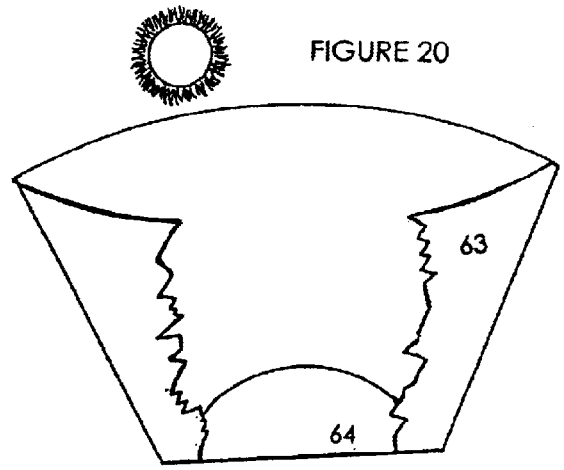
FIGS. 20 through 25 show various single layer refractive interface embodiments of the invention, forming point foci.
Figure 21:
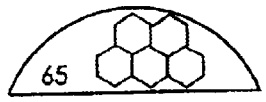
Figure 22:
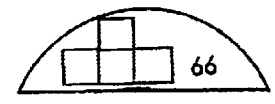
Figure 23:
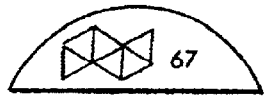
Figure 24:

FIG. 20 shows a reflective cone 63 (partially torn) feeding refractive dome 64, producing a point focus design that is intended to track. The reflective cone may taper symmetrically or asymmetrically and can be coated with a refractive substance that preferentially guides light to the focus. The refractive "dome" may be segmented into smaller space-obliterating pieces, such as squares or hexagons, which may be mounted in a separate frame, depending on the size of the dome. The word dome is used loosely and may refer to any non-planar structure resulting in a point focus.

FIGS. 21, 22, 23 and 24 show ultrastructural input shapes 65, 66, 67 and 68 respectively. The hexagons, squares, equilateral triangles and circles are drawn out of proportion for clarity. The top supporting layer is there in every embodiment.

Figure 25:
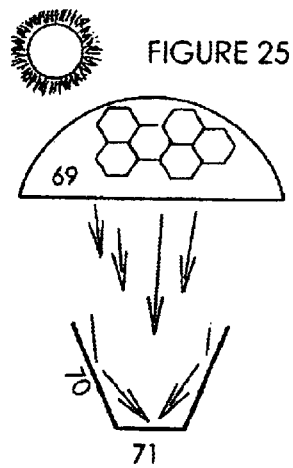

FIG. 25 demonstrates dome 69 without the optional augmentation reflectors in an exploded view. Secondary reflective cone 70 may taper symmetrically or asymmetrically and can be coated with a refractive substance that preferentially guides light to focus 71.

One embodiment of the invention provides a stand-alone streetlight, having a solar collector according to the present invention, with photoelectric converter and rechargeable battery power supply for a lamp. The inside of the secondary reflective cone would guide light to the focus. The outside of the secondary reflective cone may also redirect light radially outward (instead of skyward). The solar concentrator is mechanically supported by a clear tube which houses a fluorescent bulb. The base therein consists of heavy batteries in an insulated enclosure, lending structural stability and doubling as a bench.

Figure 26:
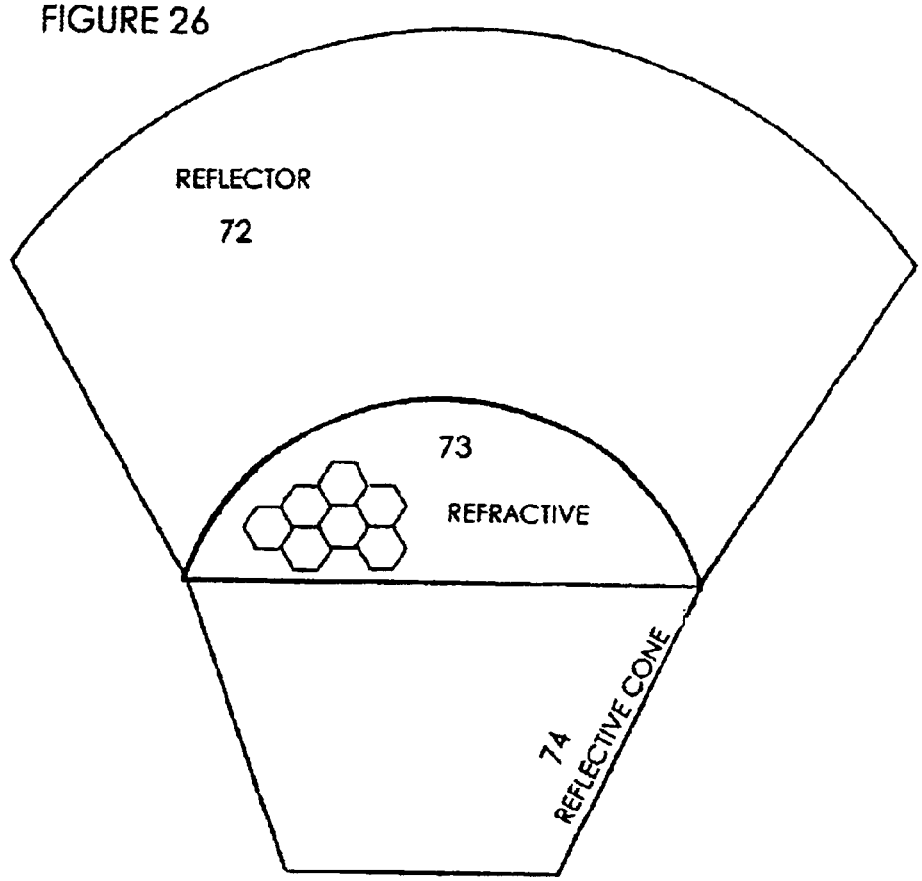
FIG. 26 shows a single layer refractive interface in a dome configuration and a stationary augmentation reflector.

FIG. 26 shows a single-layer non-tracking embodiment. Reflector 72 feeds refractive interface 73, which in turn sits on a reflective cone 74 that can guide light to various foci. For northern latitudes, reflector 72 faces south and may be coated with a material that preferentially guides light downward.

Figure 27:
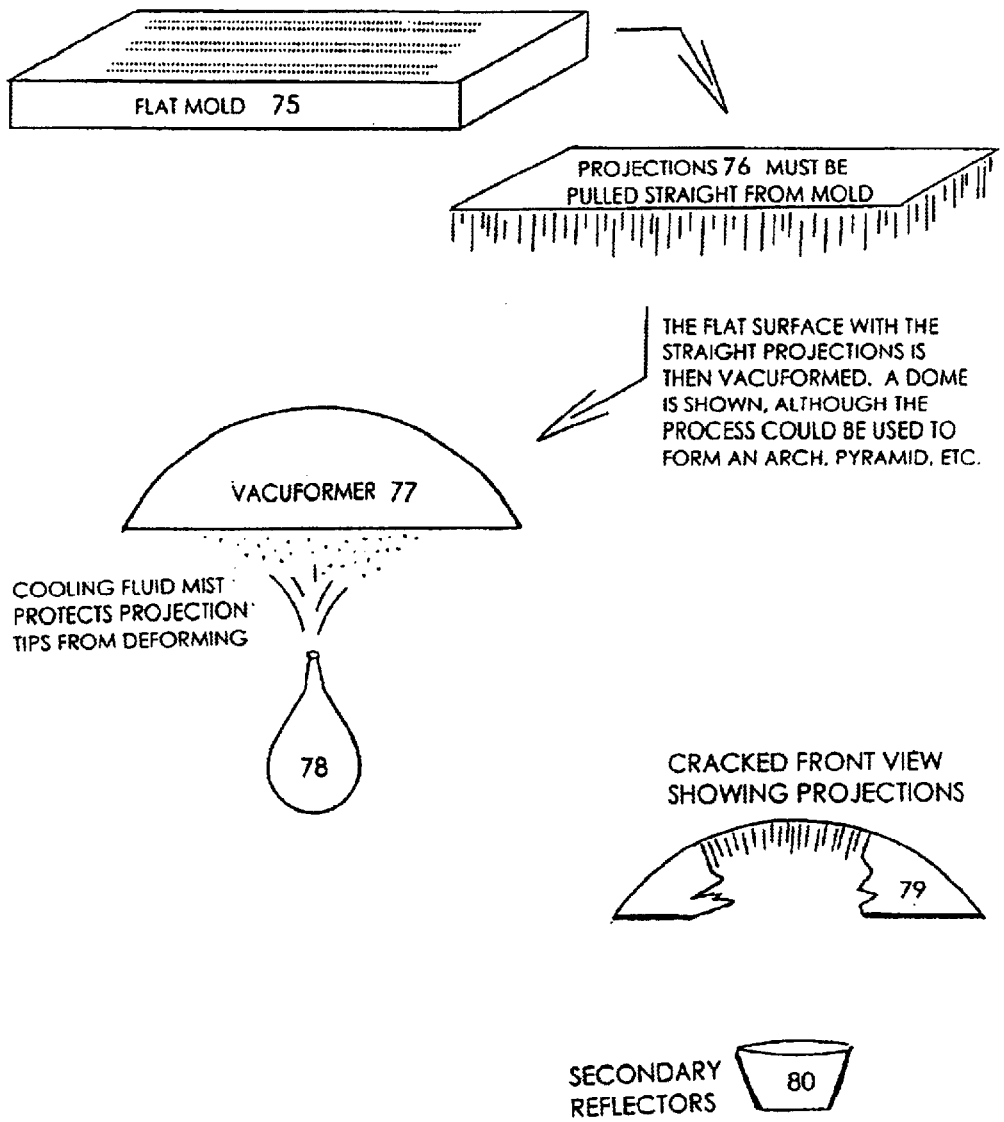
FIG. 27 schematically shows elements of a vacuum forming process for forming a curved refractive interface having a plurality of TIR elements.

FIG. 27 depicts a method for molding a non-planar refractive interface. Refractive piece 76 is pulled with straight projections from flat mold 75. The refractive piece 76 is then processed through vacuformer 77 with optional mist spray 78 to protect the tips of the projections. The result is a non-planar refractive interface with projections that could not otherwise be pulled from the mold, feeding secondary reflector(s) 80, etc.

Figure 28:
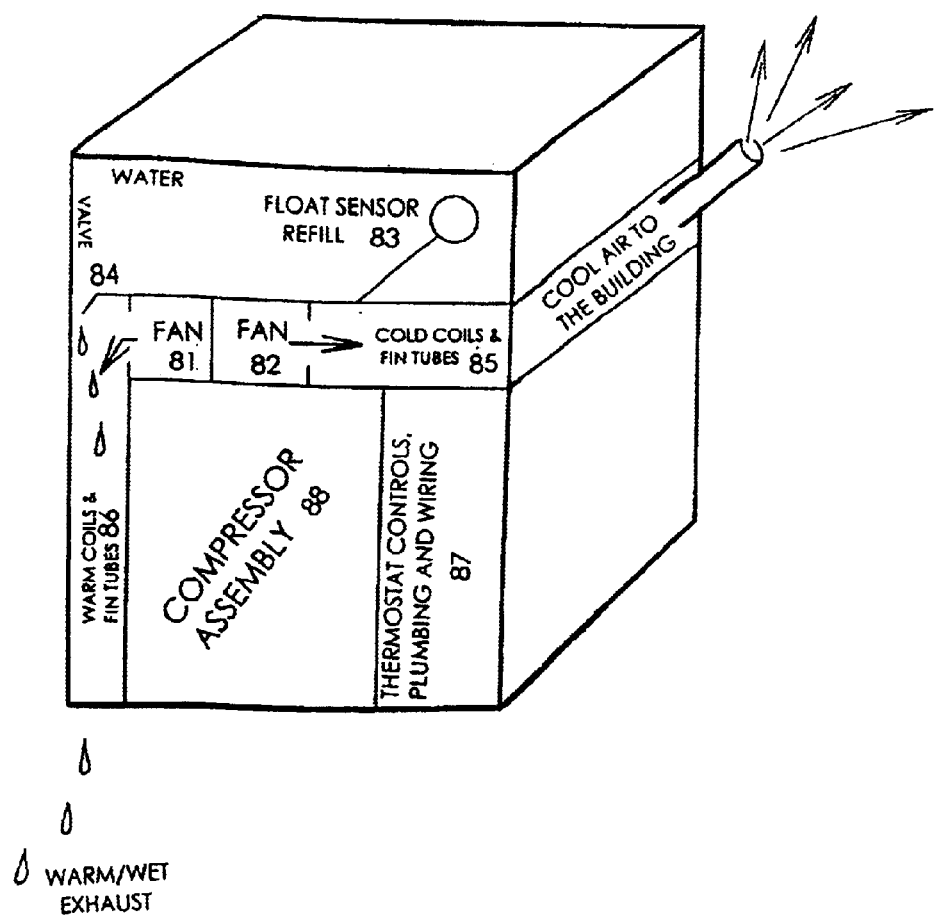
FIG. 28 shows a schematic drawing of an air conditioning system.

FIG. 28 shows an extremely efficient air conditioner, e.g., for use as an end load with concentrator systems according to the present invention. Cold water is piped to a holding tank regulated by float sensor 83. Fans 81 and 82 blow air over the warm and cold sides of the compression circuit, respectively. When valve 84 is open, water droplets are dripped over warm coils and/or fin tubes 86, thus utilizing heat of vaporization and compression synergistically in the same system, and using the heat of vaporization where it does the most good. When thermostat 87 trips compressor 88, valve 84 opens. The warm side of the compression circuit is situated in a long, narrow duct so that fast, turbulent air can be fed over it by fan 81. The warm side of the compression circuit includes a radiator, for dissipating waste heat. If the air conditioner is operated using energy from the solar collector according to the present invention, then at least a portion of the waste heat will derive from the captured solar energy. Float sensor 83 may control refilling or flushing of the system.

Figure 29:
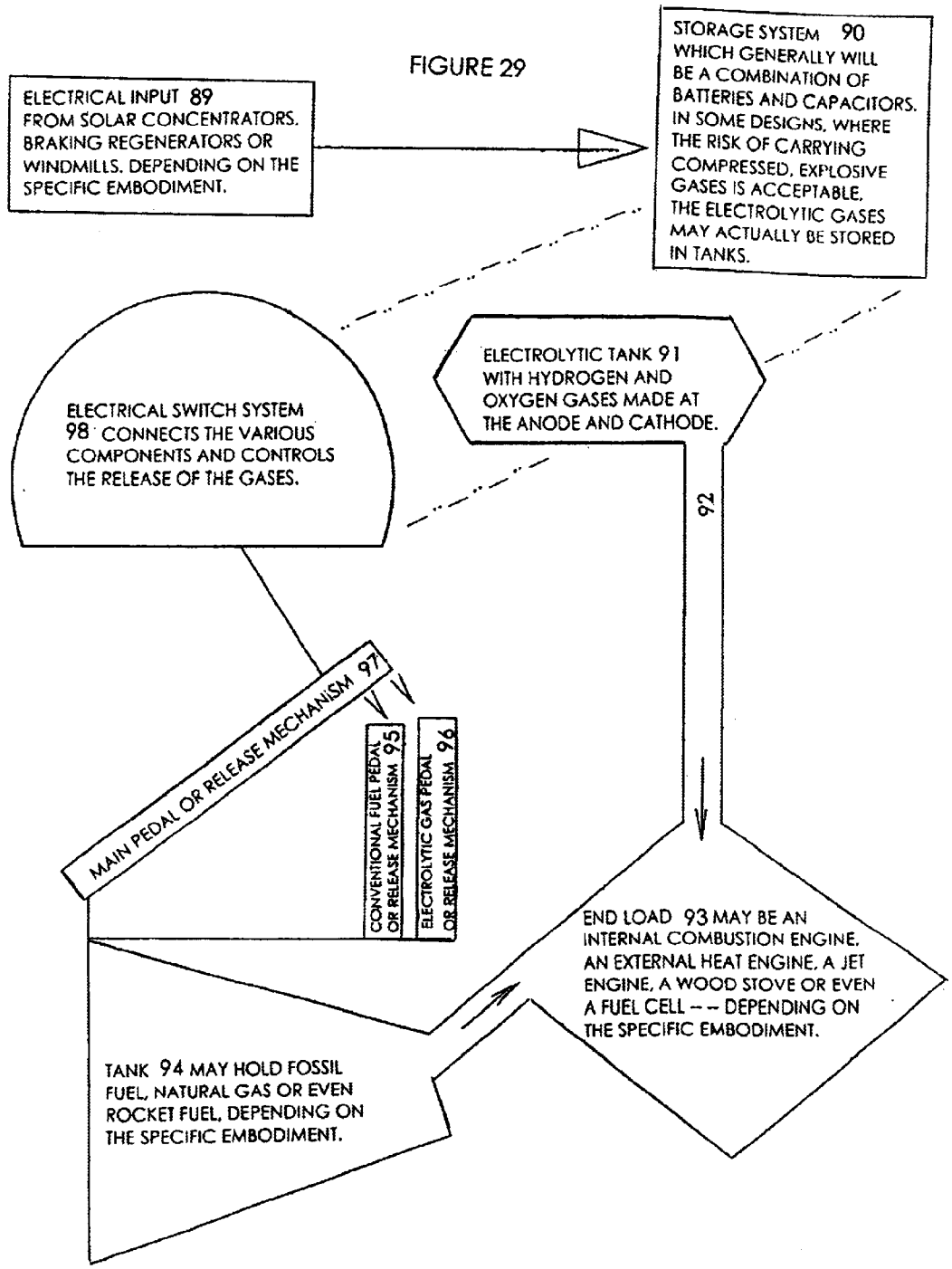
FIG. 29 shows a solar energy system generating and using electrolytic gasses.

FIG. 29 shows how electrolytic gases may be used in concert with an engine, either above the intake valves or fed directly into the cylinders. Electricity 89, such as from solar or from braking regenerators is stored in system 90. When the accelerator pedal 97 is depressed, it causes the electrical switch system 98 to cause release of fossil fuel via system 95 and electrolytic gases via system 96. The electrolytic gases are generated in tank 91 from electricity released from storage system 90, or from a solar generation system. Electrolytic gases produced in tank 91 are fed via conduit 92 to the end load 93, which may be an internal combustion engine, external heat engine, jet engine or even fuel cell.

Tank 94 holds fossil fuel, natural gas, or any other desired combustible depending on the embodiment.

Figure 30:
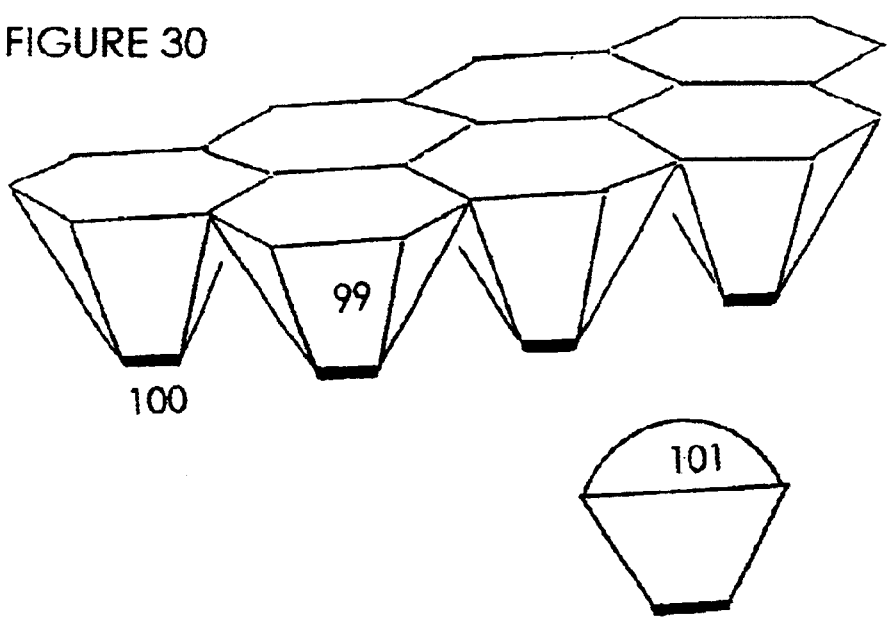
FIG. 30 shows a grid-style concentrator according to the present invention using a distributed set of solar conversion devices respectively disposed below the TIR elements.

FIG. 30 shows a "grid" style concentrator where high index substance 99 brings light to focus 100 over a short distance. In general, it is useful to make the top surface 101 convex or pyramidal. The input shapes may be hexagons, squares or circles and can be filled with a high index liquid. The goal is to widen the angle of acceptance maximally. The refractive facets may taper symmetrically or asymmetrically and may utilize a graded index of refraction. The semiconductors may sit on a metallic grid and be covered by a thin wire grid for rapid assembly. Concentration ratios of 9 suns have been reached, with slightly higher numbers possible in theory, but only at very high indices of refraction with the angle of acceptance compromised.

Figure 31:
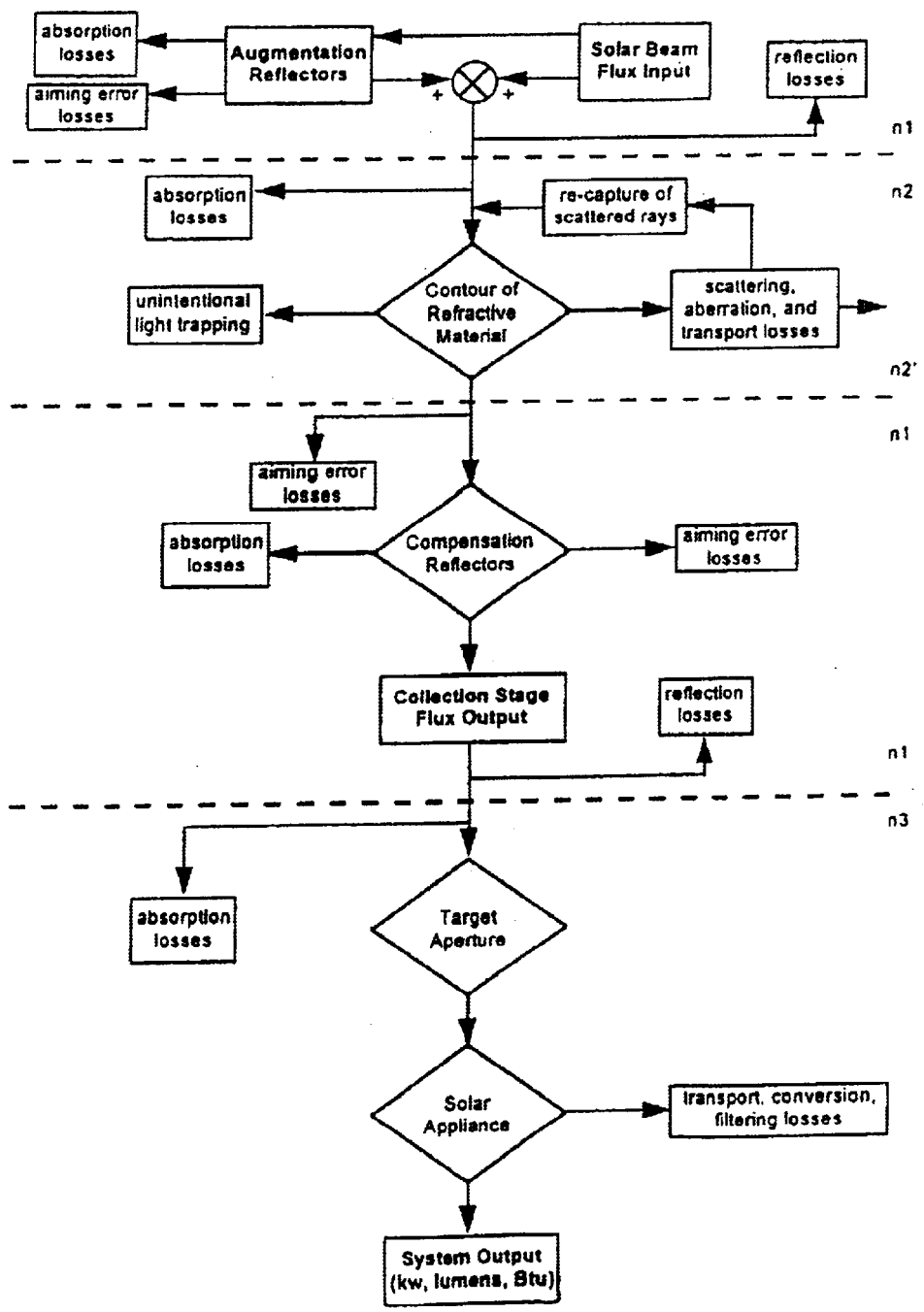
FIG. 31 shows a flow diagram of a method according to the present invention.

FIG. 31 is a photon flow chart showing the various points at which parameters for implementation and operation of solar collector according to the present invention can be optimized.

Figure 32:
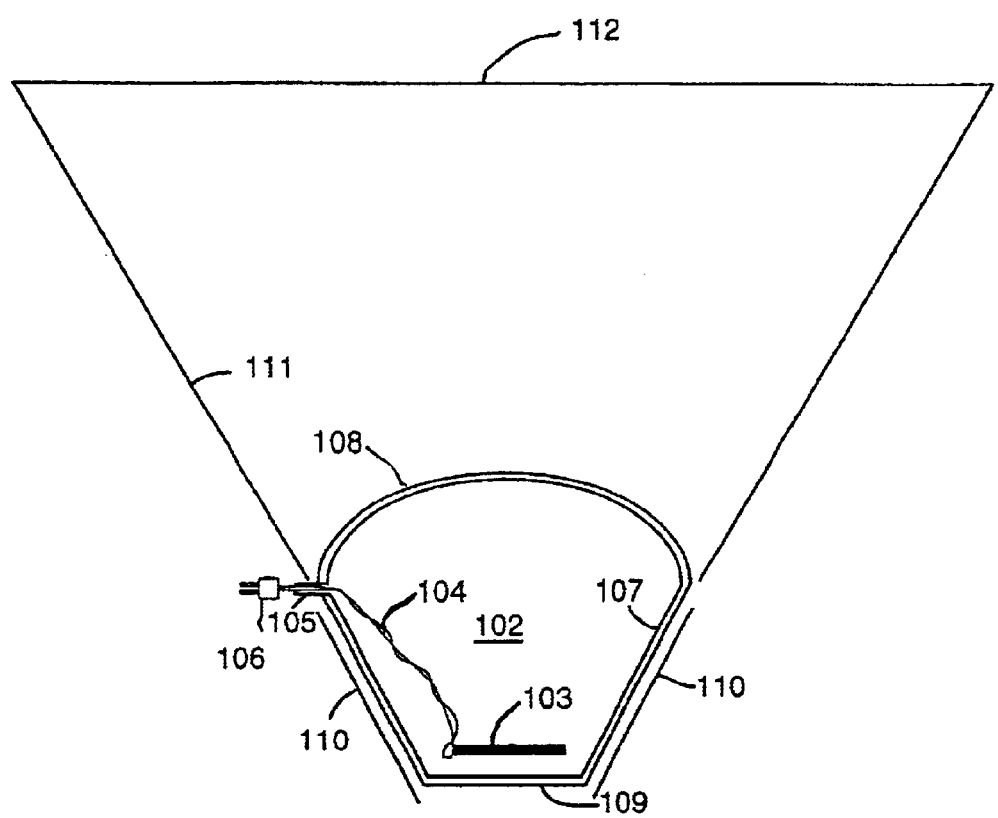
FIG. 32 shows a side view solar cell immersed in a liquid refractive medium solar concentrator according to the present invention.

FIG. 32 shows a side view of a solar cell, a type of photoelectronic device, immersed in a liquid refractive medium. The solar cell 103 is connected through wires 104 to an electrical connector 106. The solar cell 103 is, for example, a high efficiency crystalline silicon solar cell. The liquid refractive medium 102 is, for example, a mineral oil or silicone oil having a relatively high refractive index, for example in the range 1.6–2.0. The device may also include a gel material, either instead of or in conjunction with a liquid. Advantageously, the liquid (or gel) refractive medium is electrically insulating, to prevent shorting of the solar cell. Likewise, architectural constraints make a flame retardant material, especially silicone oil, advantageous. In general, refractive indices significantly greater than 1.5 are preferably employed, given available materials for the corresponding lower relative refractive index material container 107. For example, the lower relative refractive index material container 107 can be fabricated from soda lime glass or acrylic polymer, each of which generally has a refractive index of about 1.5. Further, the lower relative refractive index material container 107 is relatively thin, and surrounded by air, which has a refractive index of about 1.0, which results in an effective total internal reflection of light. The lower relative refractive index material container 107 is preferably conically tapered, with the taper angle determined by the respective refractive indices of the liquid refractive medium 102 and the lower relative refractive index material container 107. The height of the lower relative refractive index material container 107 is established to preferably provide a greater than 3 fold concentration of light energy between the entrance aperture 108 and the base 109 with light directed along the medial axis of the solar. In this case, since the solar cell is suspended in the liquid refractive medium 102, the base 109 of the lower relative refractive index material container 107 may be truncated.

Since some light may reach a critical angle and therefore exit through the external sidewall of the lower relative refractive index material container 107, reflectors 110, e.g., specular reflectors, may be provided spaced by an air gap from the sidewall of the lower relative refractive index material container 107. These reflectors 110 may be formed of shiny aluminum sheet. This allows recovery of this light. Alternately, it is also possible to provide a reflective surface on the exterior sidewall of the lower relative refractive index material container 107. Generally, the air gap is advantageous, since it assists in convection cooling and provides a relatively high refractive index differential interface to enhance total internal reflection light trapping. However, a reflective surface, formed for example from a vacuum deposited aluminum coating, simplifies construction and increases immunity to dirt and dust.

The wires 106 exit the lower relative refractive index material container 107 through a port 105. The lower relative refractive index material container 107 may be otherwise sealed with the entrance aperture 108. The port 105 provides system compliance for thermal expansion of the liquid refractive medium 102.

It is also possible to circulate liquid refractive medium 102 through a pair of ports, with a thermal radiator (not shown) to dissipate heat.

It is noted that the liquid refractive medium 102 will generally convect heat from the solar cell 103. The thermal expansion of the liquid refractive medium will also result in changes in the refractive index. Therefore, it is understood that the taper of the lower relative refractive index material container 107 may be compensated for the anticipated thermal gradients of the liquid refractive medium 102 during operation. Likewise, the lower relative refractive index material container 107 may be provided with a graded or variable refractive index, which will also influence the optimal taper configuration.

The solar collector may also include an augmentation reflector 111 system, having a taper leading between an input aperture 112 and the entrance aperture 108 of the total internal reflection module.

Figure 33:
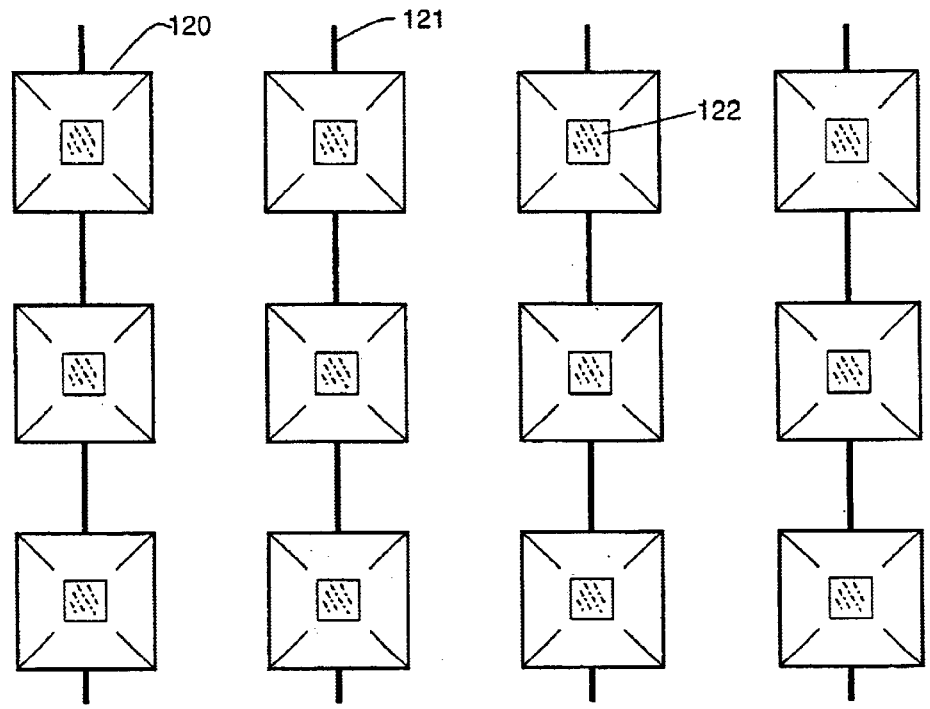
FIG. 33 shows a top view of an array of solar collector assemblies according to the present invention mounted for synchronous solar tracking.
Figure 34:
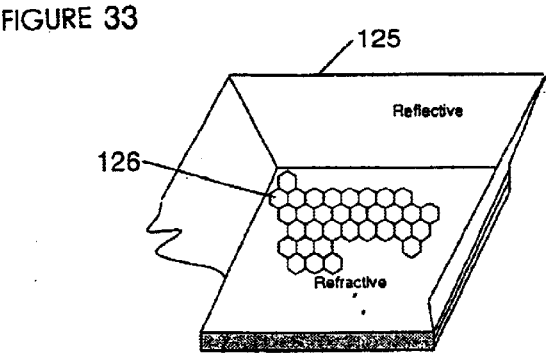
FIG. 34 shows cracked front view of a solar collector assembly according to the present invention composed of a plurality of collector modules with a common augmentation reflector.

As shown in FIGS. 33 and 34, sets of total internal reflection modules 122, 126 which may be liquid-filled or solid, may be provided with a common augmentation reflector 120, 125 in a tiled array. Preferably, where augmentation reflectors 120 are provided on all sides, the solar collection modules track the sun. As shown in FIG. 33, synchronous tracking bars 121 may be provided to tilt a plurality of solar collection modules 122 over the course of time, for example to accommodate solar diurnal variation and/or seasonal variation.

Although various preferred embodiments of the present invention have been described herein in detail, it will be appreciated by those skilled in the art, that variations may be made thereto without departing from the spirit of the invention or the scope of the appended claims.

What is claimed is:

1. A solar collector comprising an elongated light guide, having an axis, said light guide comprising a high optical refractive index liquid or gel material and an optical interface between said high optical refractive index liquid or gel material and a relatively lower optical refractive index solid material, and an entrance aperture structure adapted to receive incident light deviating from said axis, said optical interface having portions convergent with respect to increasing optical distance from said entrance aperture through said high optical refractive index liquid or gel material, wherein said high optical refractive index liquid or gel material of said elongated light guide concentrates light received through said entrance aperture and provides light concentration as compared to incident optical density on said entrance aperture; and a photoelectronic solar transducer for employing energy from said incident light, immersed within scud high optical refractive index liquid or gel material.

2. The solar collector according to claim 1, wherein said entrance aperture comprises a convex surface.

3. The solar collector according to claim 1, further comprising augmentation reflectors for reflecting solar energy onto said entrance aperture.

4. The solar collector according to claim 1, wherein said high optical refractive index liquid or gel material has a varying index of refraction.

5. The solar collector according to claim 1, further comprising a thermal radiator for dissipating heat.

6. The solar collector according to claim 1, wherein said solar collector has a polygonal shape normal to said axis at a level of said entrance aperture structure.

7. The solar collector according to claim 1, further comprising a reflector for recapturing light emitted by said relatively lower optical refractive index solid material through an air gap.

8. The solar collector according to claim 1, further comprising a reflector for recapturing light disposed at a peripheral surface of said relatively lower optical refractive solid material.

9. The solar collector according to claim 1, further comprising an enclosed space for said high optical refractive index liquid or gel material, defined at least in part by said relatively lower optical refractive index solid material, having a port for accommodating flow of said high optical refractive index liquid or gel material.

10. The solar collector according to claim 1, wherein said high optical refractive index liquid or gel material comprises an electrical insulator.

11. The solar collector according to claim 1, wherein said high optical refractive index liquid or gel material is adapted in convect heat from said photoelectronic solar transducer.

12. The solar collector according to claim 1, wherein said high optical refractive index liquid or gel material is flame retardant.

13. A solar collector comprising a tapered elongated light guide having an axis, comprising a high optical refractive index material and an optical interface between said high optical refractive index material and a relatively lower optical refractive index solid material, and an entrance aperture adapted to receive incident light deviating from said axis, wherein said high optical refractive index material of said elongated light guide transmits and concentrates light received through said entrance aperture by a process of total internal reflection, said optical interface having portions convergent with respect to increasing optical distance through said high optical refractive index material from said entrance aperture, said tapered elongated light guide having a taper angle dependent on a ratio of the high optical refractive index to the relatively lower optical refractive index.

14. The solar collector according to claim 13, wherein said elongated light guide is configured such that incident light deviating from said axis received through said entrance aperture undergoes successive internal reflections in said high optical refractive index material, each reflection having a successive angle of incidence on an interface between said high optical refractive index material and said relatively lower optical refractive index solid material until a critical angle is reached, whereupon the light is transmitted through the interface into said relatively lower optical refractive index solid material at a smaller angle with respect to the axis than the incident light.

15. The solar collector according to claim 13, wherein said entrance aperture comprises a convex surface.

16. The solar collector according to claim 13, further comprising a solar receptor for employing energy from said incident light selected from the group consisting of a photovoltaic transducer, photohydrolytic transducer, a heat engine, a light pipe and a photothermal receptor.

17. The solar collector according to claim 13, further comprising augmentation reflectors for reflecting solar energy onto said entrance aperture.

18. The solar collector according to claim 13, wherein said high optical refractive index material has a varying index of refraction.

19. The solar collector according to claim 13, further comprising a primary Stirling cycle engine receiving solar energy from said solar collector, and a secondary steam engine operating off a water jacket heat sink from said primary Stirling cycle engine.

20. The solar collector according to claim 13, further comprising a thermal radiator for dissipating heat.

21. The solar collector according to claim 13, wherein said solar collector has a polygonal shape normal to said axis at a level of said entrance aperture structure.

22. A solar collector comprising an elongated light guide, having an axis, said light guide comprising a high optical refractive index material and an optical interface between said high optical refractive index material and a relatively lower optical refractive index material, and an entrance aperture structure adapted to receive incident light deviating from said axis, said optical interface having portions convergent with respect to increasing optical distance from said entrance aperture through said high optical refractive index material, wherein said high optical refractive index material of said elongated light guide concentrates light received through said entrance aperture and provides light concentration as compared to incident optical density on said entrance aperture, at least a portion of the light exiting into said relatively lower optical refractive index material; and a reflector for recovering light from the relatively lower optical refractive index material.

23. The solar collector according to claim 22, wherein said entrance aperture comprises a convex surface.

24. The solar collector according to claim 22, further comprising a solar receptor for employing energy from said incident light selected from the group consisting of a photovoltaic transducer, photohydrolytic transducer, a heat engine, a light pipe and a photothermal receptor.

25. The solar collector according to claim 22, further comprising augmentation reflectors for reflecting solar energy onto said entrance aperture.

26. The solar collector according to claim 22, wherein said high optical refractive index material has a varying index of refraction.

27. The solar collector according to claim 22, further comprising a primary Stirling cycle engine receiving solar energy from said solar collector, and a secondary steam engine operating oil a water jacket heat sink from said primary Stirling cycle engine.

28. The solar collector according to claim 22, further comprising a thermal radiator for dissipating heat.

29. The solar collector according to claim 22, wherein said solar collector has a polygonal shape normal to said axis at a level of said entrance aperture structure.

30. The solar collector according to claim 22, wherein said high optical refractive index material is a liquid.

* * * * *